(12) United States Patent
Panigrahy et al.

(10) Patent No.: US 7,308,446 B1
(45) Date of Patent: Dec. 11, 2007

(54) METHODS AND APPARATUS FOR REGULAR EXPRESSION MATCHING

(75) Inventors: Rina Panigrahy, Sunnyvale, CA (US); William Nelson, Los Altos, CA (US); Anh Tien Nguyen, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 329 days.

(21) Appl. No.: 10/340,392

(22) Filed: Jan. 10, 2003

(51) Int. Cl.
*G06F 7/26* (2006.01)

(52) U.S. Cl. .......................................... 707/6; 707/101

(58) Field of Classification Search ................... 707/6, 707/3, 101; 706/48
See application file for complete search history.

(56) References Cited

U.S. PATENT DOCUMENTS

| | | | | |
|---|---|---|---|---|
| 4,241,402 A | * | 12/1980 | Mayper et al. ................. | 707/6 |
| 6,263,333 B1 | * | 7/2001 | Houchin et al. ................ | 707/5 |
| 6,571,243 B2 | * | 5/2003 | Gupta et al. .................... | 707/6 |
| 6,892,237 B1 | * | 5/2005 | Gai et al. ..................... | 709/224 |
| 2003/0051043 A1 | * | 3/2003 | Wyschogrod et al. ......... | 709/230 |

OTHER PUBLICATIONS

Ken Thompson, "Programming Techniques", ACM, vol. 11, No. 6, Jun. 1968, pp. 419-422.*

Sun Wu, Udi Manber, Eugene Myers, "A sub-Quadratic Algorithm for Approximate Regular Expression Matching", Journal of Algorithms, vol. 19, Issue 3, 1995, pp. 1-14.*

M. Barrio, P. de la Fuente, and J. Vegas, *A Recursive Version of the Shift Or Algorithm*, Proceedings of 14th Iasted, Iasted Acta Press, 1996, páginas 15-18.

R. Baeza-Yates and G. Gonnet, *A New Approach To Text Searching*, Communications of the ACM, 35(10), pp. 74-82, 1992.

R.Boyer and J.Moore, *A Fast String Searching Algorithm*. Communications of the ACM, 20(10), pp. 761-772, 1977.

Merrill E. Isenman and Dennis E. Shasha, *Performance and Architectural Issues for String Matching*, IEEE Transactions on Computers, vol. 39, No. 2, Feb. 1990, pp. 238-250.

(Continued)

*Primary Examiner*—Paul Rodriguez
*Assistant Examiner*—Luke Osborne
(74) *Attorney, Agent, or Firm*—The Law Office of Kirk D. Williams

(57) ABSTRACT

Methods and apparatus are disclosed for regular expression matching, especially for, but not limited to high-speed applications such as in a packet switching system (e.g., a router). One implementation includes a matching mechanism for processing each character of a plurality of input characters to progressively generate keyword indications of matched keywords as matched keywords are identified, and for generating one or more matching indications of matched base expressions and non-keyword expressions. These indications are received by a matched regular expression detection mechanism which generates one or more matched regular expression indications based on said one or more keyword indications and said one or more matching indications. In one implementation, the matched regular expression detection mechanism maintains a keyword data structure, which is updated as matched keyword indications are received to ensure they are matched in a proper order. One implementation uses a bitmap to track the matched keywords and AND-SHIFT-OR operations to efficiently update the bitmap.

24 Claims, 10 Drawing Sheets

OTHER PUBLICATIONS

Josue Kuri and Gonzalo Navarro, *Fast Multipattern Search Algorithms for Intrusion Detection*, Proceedings of the Seventh International Symposium on String Proceedings and Information Retrieval (SPIRE '00), IEEE, 2000, 12 pages.

C. Jason Coit, Stuart Staniford, and Joseph McAlerney, *Towards Faster String Matching for Intrusion Detection or Exceeding the Speed of Snort*, Proceedings of the DARPA Information Survivability Conference and Exposition (DISCEXII '01), IEEE, 2001, 7 pages.

Peter C. Wayner, *Using Content-Addressable Search Engines to Encrypt and Break DES*, Computer Science Department, Cornell University, 1991, 11 pages.

\* cited by examiner

401 — EXPRESSION-1: $X_1 * X_2 * X_3 * X_4$

402 — EXPRESSION-2: $Y_1 * Y_2 * Y_3 * Y_4 * Y_5$

403 —  EXPRESSION MATCHING BIT VECTOR

410 — | 1 0 1 1 0 |  EXPRESSION MATCHING BIT VECTOR AT TIME T

411 — | 1 0 0 1 0 |  KEYWORD BIT VECTOR INDICATING NEWLY MATCHED KEYWORDS AT TIME T

⇩ AND

412 — | 1 0 0 1 0 |

⇩ SHIFT

413 — | 0 1 0 0 1 |

⇩ OR

414 — | 1 1 1 1 1 |  AND-SHIFT-OR RESULT

415 — | 0 0 0 0 1 |  INDICATION OF MATCHED BASE EXPRESSION $Y_1 * Y_5$ AND NOT $X_1 * X_4$

⇩ AND

416 — | 0 0 0 0 1 |  INDICATION OF REGULAR EXPRESSION $Y_1 * Y_2 * Y_3 * Y_4 * Y_5$ AND NOT MATCHED $X_1 * X_2 * X_3 * X_4$

METHODS AND APPARATUS FOR REGULAR EXPRESSION MATCHING

FIELD OF THE INVENTION

This invention especially relates to communications and computer systems; and more particularly, the invention relates to regular expression matching of particular applicability, but not limited to high-speed applications such as in a packet switching system (e.g., router, etc.)

BACKGROUND OF THE INVENTION

The communications industry is rapidly changing to adjust to emerging technologies and ever increasing customer demand. This customer demand for new applications and increased performance of existing applications is driving communications network and system providers to employ networks and systems having greater speed and capacity (e.g., greater bandwidth). In trying to achieve these goals, a common approach taken by many communications providers is to use packet switching technology. Increasingly, public and private communications networks are being built and expanded using various packet technologies, such as Internet Protocol (IP).

Regular expression matching is becoming a common operation to be performed at high speeds. For example, URLs may need to be located in Layer 7 (L7) packet headers only if they match a set of regular expressions to classify the sessions appropriately. Similarly, regular expression matching is used for intrusion detection, security screening (e.g., whether an email or other message contains certain patterns of keywords), load balancing of traffic across multiple servers, and array of many other applications.

A problem, especially for high speed applications, is the rate at which matching can be performed, as well as the space required to store the match identification data structure. A common method to match common expressions is to convert them to a DFA (deterministic finite automaton). The use of DFAs for regular expression matching which produces a set of matched regular expressions upon reaching a final state is well-known. From one perspective, a DFA is a state machine which processes each character of an input string, and upon reaching a final state, generates a list of one or matched regular expressions. The memory requirements and speed at which these DFAs may be traversed may not meet the needs of certain applications, especially some high-speed applications.

For example, if multiple regular expressions are to be simultaneously matched against, then the DFAs for the different regular expressions typically are multiplied to get a single DFA for the entire collection. However, multiplying DFAs together can generate an exponential number of states, thus making it impractical for certain applications. Individual DFAs could be simultaneously checked, however such an approach requires that the state for each DFA be updated for each character processed. For each character in the string this could mean a large number of memory accesses, one for each DFA. Alternatively, the DFAs could be multiplied together to form a combined DFA, Needed are new methods and apparatus for performing high speed regular expression matching.

SUMMARY OF THE INVENTION

Methods and apparatus are disclosed for regular expression matching in a system, such as, but not limited to a computer or communications system. One embodiment includes a matching mechanism for processing each character of a plurality of input characters to progressively generate keyword indications of matched keywords as matched keywords are identified, and for generating one or more matching indications of matched base expressions and non-keyword expressions. These indications are received by a matched regular expression detection mechanism which generates one or more matched regular expression indications based on said one or more keyword indications and said one or more matching indications. In one embodiment, the matched regular expression detection mechanism maintains a keyword data structure, which is updated as matched keyword indications are received to ensure they are matched in a proper order. One embodiment uses a bitmap to track the matched keywords and AND-SHIFT-OR operations to efficiently update the bitmap in a manner that ensures that all previous keywords in the order defined by a regular expression are matched prior to updating the bitmap in response to one of the newly matched keywords.

BRIEF DESCRIPTION OF THE DRAWINGS

The appended claims set forth the features of the invention with particularity. The invention, together with its advantages, may be best understood from the following detailed description taken in conjunction with the accompanying drawings of which:

DETAILED DESCRIPTION

Figure 1A:
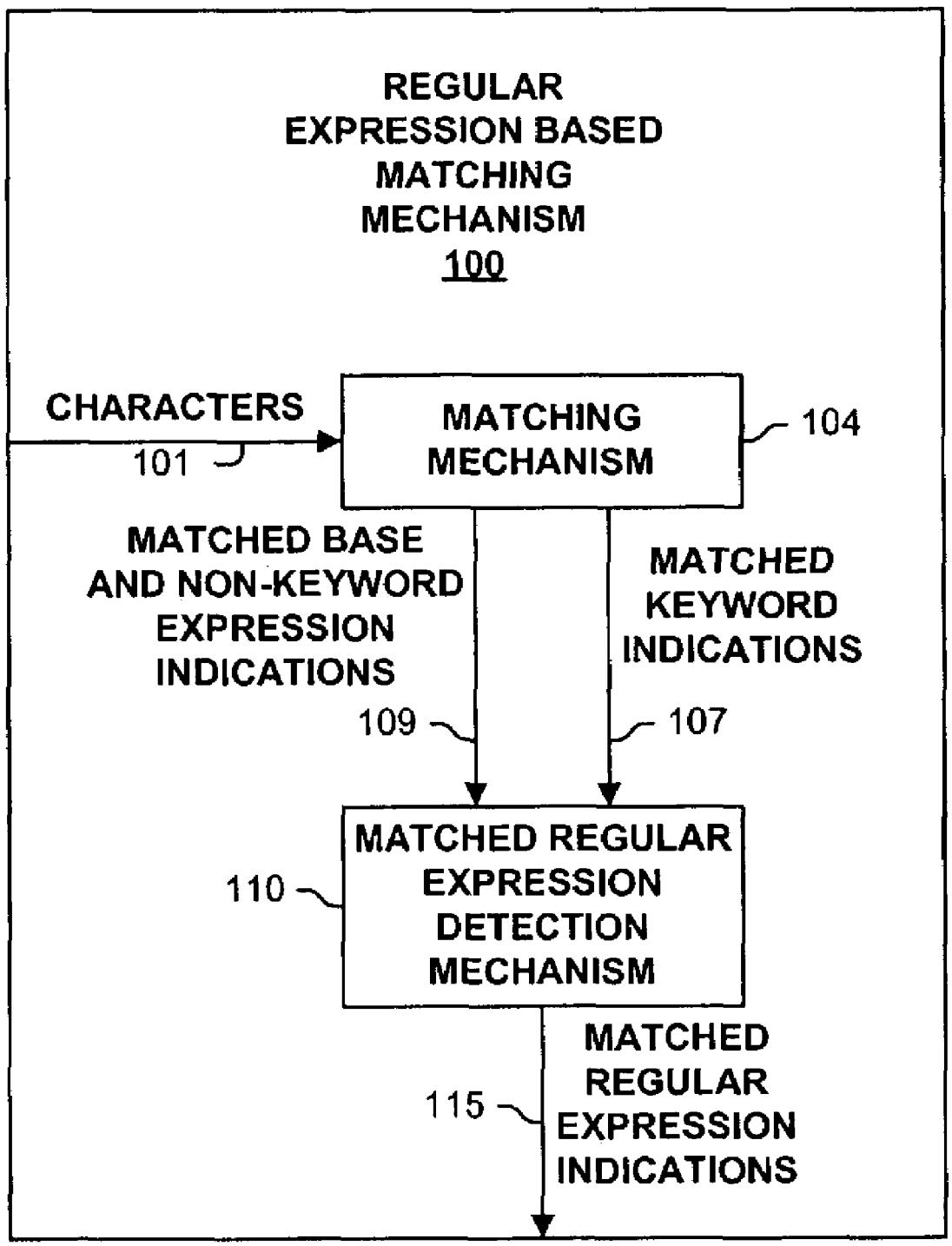
FIG. 1A is a block diagram of a regular expression matching mechanism used in one embodiment.

Methods and apparatus are disclosed for regular expression matching in a system, such as, but not limited to a computer or communications system. Embodiments described herein include various elements and limitations, with no one element or limitation contemplated as being a critical element or limitation. Each of the claims individually recites an aspect of the invention in its entirety. Moreover, some embodiments described may include, but are not limited to, inter alia, systems, networks, integrated circuit chips, embedded processors, ASICs, methods, and computer-readable medium containing instructions. The embodiments described hereinafter embody various aspects and configurations within the scope and spirit of the invention, with the figures illustrating exemplary and non-limiting configurations.

As used herein, the term "packet" refers to packets of all types or any other units of information or data, including, but not limited to, fixed length cells and variable length packets, each of which may or may not be divisible into smaller packets or cells. The term "packet" as used herein also refers to both the packet itself or a packet indication, such as, but not limited to all or part of a packet or packet header, a data structure value, pointer or index, or any other part or identification of a packet. Moreover, these packets may contain one or more types of information, including, but not limited to, voice, data, video, and audio information. The term "item" is used herein to refer to a packet or any other unit or piece of information or data. The phrases "processing a packet" and "packet processing" typically refer to performing some steps or actions based on the packet contents (e.g., packet header or other fields), and such steps or action may or may not include modifying and/or forwarding the packet and/or associated data.

The term "system" is used generically herein to describe any number of components, elements, sub-systems, devices, packet switch elements, packet switches, routers, networks, computer and/or communication devices or mechanisms, or combinations of components thereof. The term "computer" is used generically herein to describe any number of computers, including, but not limited to personal computers, embedded processing elements and systems, control logic, ASICs, chips, workstations, mainframes, etc. The term "processing element" is used generically herein to describe any type of processing mechanism or device, such as a processor, ASIC, field programmable gate array, computer, etc. The term "device" is used generically herein to describe any type of mechanism, including a computer or system or component thereof. The terms "task" and "process" are used generically herein to describe any type of running program, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may be performed in the same or in a different serial or parallel ordering and/or by different components and/or processes, threads, etc., and/or over different connections and be combined with other functions in other embodiments in keeping within the scope and spirit of the invention. Furthermore, the term "identify" is used generically to describe any manner or mechanism for directly or indirectly ascertaining something, which may include, but is not limited to receiving, retrieving from memory, determining, calculating, generating, etc.

Moreover, the terms "network" and "communications mechanism" are used generically herein to describe one or more networks, communications mediums or communications systems, including, but not limited to the Internet, private or public telephone, cellular, wireless, satellite, cable, local area, metropolitan area and/or wide area networks, a cable, electrical connection, bus, etc., and internal communications mechanisms such as message passing, interprocess communications, shared memory, etc. The term "message" is used generically herein to describe a piece of information which may or may not be, but is typically communicated via one or more communication mechanisms of any type.

The term "storage mechanism" includes any type of memory, storage device or other mechanism for maintaining instructions or data in any format. "Computer-readable medium" is an extensible term including any memory, storage device, storage mechanism, and/or other storage mechanism(s). The term "memory" includes any random access memory (RAM), read only memory (ROM), flash memory, integrated circuits, and/or other memory components or elements. The term "storage device" includes any solid state storage media, disk drives, diskettes, networked services, tape drives, and other storage devices. Memories and storage devices may store computer-executable instructions to be executed by a processing element and/or control logic, and data which is manipulated by a processing element and/or control logic. The term "data structure" is an extensible term referring to any data element, variable, data structure, database, and/or one or more organizational schemes that can be applied to data to facilitate interpreting the data or performing operations on it, such as, but not limited to memory locations or devices, sets, queues, trees, heaps, lists, linked lists, arrays, tables, pointers, etc. A data structure is typically maintained in a storage mechanism. The terms "pointer" and "link" are used generically herein to identify some mechanism for referencing or identifying another element, component, or other entity, and these may include, but are not limited to a reference to a memory or other storage mechanism or location therein, an index in a data structure, a value, etc.

The term "one embodiment" is used herein to reference a particular embodiment, wherein each reference to "one embodiment" may refer to a different embodiment, and the use of the term repeatedly herein in describing associated features, elements and/or limitations does not establish a cumulative set of associated features, elements and/or limitations that each and every embodiment must include, although an embodiment typically may include all these features, elements and/or limitations. In addition, the phrase "means for xxx" typically includes computer-readable medium containing computer-executable instructions for performing xxx.

In addition, the terms "first," "second," etc. are typically used herein to denote different units (e.g., a first element, a second element). The use of these terms herein does not necessarily connote an ordering such as one unit or event occurring or coming before another, but rather provides a mechanism to distinguish between particular units. Additionally, the use of a singular tense of a noun is non-limiting, with its use typically including one or more of the particular item rather than just one (e.g., the use of the word "memory" typically refers to one or more memories without having to specify "memory or memories," or "one or more memories" or "at least one memory", etc.) Moreover, the phrases "based on x" and "in response to x" are used to indicate a minimum set of items x from which something is derived or caused, wherein "x" is extensible and does not necessarily describe a complete list of items on which the operation is performed, etc. Additionally, the phrase "coupled to" is used to indicate some level of direct or indirect connection between two elements or devices, with the coupling device or devices modifying or not modifying the coupled signal or communicated information. The term "subset" is used to indicate a group of all or less than all of the elements of a set. Moreover, the term "or" is used herein to identify a selection of one or more, including all, of the conjunctive items.

Methods and apparatus are disclosed for regular expression matching, especially for, but not limited to high-speed applications such as in a packet switching system (e.g., a router). One embodiment includes a matching mechanism for processing each character of a plurality of input characters to progressively generate keyword indications of matched keywords as matched keywords are identified, and for generating one or more matching indications of matched base expressions and non-keyword expressions. These indications are received by a matched regular expression detection mechanism which generates one or more matched regular expression indications based on said one or more keyword indications and said one or more matching indications. In one embodiment, the matched regular expression detection mechanism maintains a keyword data structure, which is updated as matched keyword indications are received to ensure they are matched in a proper order. One embodiment uses a bitmap to track the matched keywords and AND-SHIFT-OR operations to efficiently update the bitmap in a manner that ensures that all previous keywords in the order defined by a regular expression are matched prior to updating the bitmap in response to one of the newly matched keywords.

One embodiment receives a collection of prioritized regular expressions as input, determines, and programs the regular expression matching system. One embodiment parses a regular expression in an attempt to decrease the number of states typically required for the state machine to be used for identifying the matched expressions. Typically, the number of states grows exponentially when the multiplied (e.g., combined) as the state machine (e.g., DFA) needs to "remember" which keywords it has seen, and these keywords can be in different positions within the string. If the number of keywords is k, the number of subsets of keywords it has seen could be $2^k$. One embodiment reduces the number of states required by a traditional DFA approach by tracking the matching of keywords.

In one embodiment, a first stage state machine (e.g., DFA) performs the regular expression matching, and progressively signals a second stage regular expression matching mechanism at each state as to any identified matching keywords. The second stage remember all the matched keywords. After the entire input string has passed through the first stage, the second stage looks at the collection of keywords along with the suffix-prefixes that are matched and outputs the highest priority regular expression that is matched. Additionally, one embodiment indicates a subset or all of the matching regular expressions.

As used herein, an expression of the form X* is called a prefix type regular expression, where X is a string consisting of one or more characters and '*' represents zero or more characters (in some contexts denoted ".*"). An expression of the form *X is called a suffix type regular expression. An expression of the form $X_1 * X_n$ is called a base expression (or suffix-prefix type regular expression), which corresponds to string $X_1$ followed by zero or more characters, then followed by the keyword $X_n$.

In one embodiment, a keyword regular expression to be matched is in the form of $X_1 * X_2 * X_3 \ldots * X_n$, where each $X_i$ is a constant string and $X_2, X_3, \ldots, X_{n-1}$ are referred to as keywords, and $X_1 * X_n$ is called a base expression. In one embodiment, a string S is considered to have matched the regular expression if (a) $X_1$ is a prefix of S, (b) $X_n$ is a suffix of S, and (c) $X_2, X_3, \ldots, X_{n-1}$ occur as substrings of S with their ending points in that order. Additionally, one embodiment requires the exact, non-overlapping matching of all keywords in order for a match to be defined, by identifying expressions where the keywords and the suffix and the prefix cannot overlap with each other. Additionally, regular expressions to be matched may also contain other operations such as the '|' (Or), ?. For example, in one embodiment, regular expressions to be matched may include such operations as (a|A)*(b|B)*(c|C).

One embodiment matches keyword and non-keyword expressions, where a non-keyword expression contains no keywords. For example, a non-keyword expression could be a string that is exactly matched, a base expression, etc.

One embodiment receives a particular regular expression X*Y*Z, and identifies a corresponding base expression X*Z and suffix-type expression *Y. In one embodiment, expression *Y is matched as soon as a Y is identified in the input string and the second stage is notified about this match. Thus, in one embodiment receiving the regular expressions $X_1 * Y_1 * Z_1$, $X_2 * Y_2 * Z_2$, ... to match, the expressions $X_1 * Z_1$, $* Y_1$, $X_2 * Z_2$, $* Y_2$ ... are produced. Their state machines are then multiplied to get a relatively smaller single state machine, which is used in one embodiment.

Note, it is possible that such partitioning may result in an indication of a regular expression being matched according to the rules of one embodiment; however, when the regular expression is strictly construed, the actual regular expression may not have been truly matched, such might be the case when an X and Y, or Y and Z can overlap. This is perfectly fine in one embodiment, while another embodiment requiring strict matching of regular expressions may not partition overlapping portions an input regular expression, which will typically result in a larger match state machine in one embodiment when compared to another one embodiment.

Multiplying DFAs or other state machines for n regular expressions could lead to $2^n$ states. However, certain types of regular expressions do not lead to exponentially number of states when multiplied together. A product of DFAs or other state machines for n prefix type regular expressions can have at most linear number of states that is at most the sum of the lengths of each expression. The same is true about a collection of suffix type expressions. As for suffix-prefix type expressions, the number of states is at most quadratic in the size of the input, and is linear in many cases. Thus, by selectively decomposing regular expressions into prefix and suffix type expressions, it is possible to reduce the overall number of states (and eliminate the exponential explosion) when their DFAs or other state machines are multiplied together.

In one embodiment, if there are k keywords, the matched regular expression detection mechanism, a second stage element in one embodiment, maintains a bit vector of length k. (Note, the terms bitmap and bit vector are used interchangeably herein.) When a keyword is matched in a matching mechanism, a first stage element in one embodiment, one or more bits may need to be set in this bit vector as more that one keyword maybe matched at a time in a particular regular expression. In one embodiment, the bits set are obtained by looking up in a matched keyword data structure typically indexed by the current state of the DFA (or other matching mechanism).

When processing of the characters of the input string is complete or a final state is reached in the matching mechanism, the matched regular expression detection mechanism receives an indication of the final state of the matching mechanism. This final state indication identifies the matched suffixes and prefixes from the regular expressions. In one embodiment, this final state indication is used to index into a final state matching data structure to identify the set of regular expressions whose suffixes and prefixes are matched. In one embodiment, this set is divided into two categories: non-keyword expressions and base expressions. In one embodiment, the matched non-keyword expressions are identified as a list in decreasing order of priority. In one embodiment, the matched base expressions are identified in a k-bit vector. Anding this vector with the k-bit state vector gives exactly those keyword expressions that are matched. The left most one in this final vector gives the highest priority keyword expression matched. The highest priority non-keyword expression is obtained from the head of the list.

In one embodiment, the input string is fed to the matching mechanism (e.g., DFA etc.) Whenever a keyword is matched, the matching mechanism sends an indication of the matched keyword to the matched regular expression detection mechanism. In one embodiment, this indication corresponds to a state of the matching mechanism. The matched regular expression detection mechanism looks up this state in a matched keyword data structure, and sets the identified bits in one or more of the expression matching bit vectors. After the matching mechanism is finished with the string, it also sends an indication of the final state of the DFA to the matched regular expression detection mechanism, which looks up this state in a final state matching data structure to obtain a list of non-keyword regular expressions and bit vector for the matched keyword expressions. The matched regular expression detection mechanism ANDs this matched keyword bit vector with the expression matching bit vectors and finds the position of the left most set bit to identify the highest priority matching keyword expression. It compares its priority with that of the matched non-keyword expression at the head of the prioritized list and returns the one with the greater priority. In one embodiment, more than one matched expression is identified.

For example, the regular expression X*Y*Z*U requires that X and U are prefixes and suffixes of the input string, and Y and Z are present in the string with the Y occurring before the Z. It is also necessary that the occurrences of X, Y, Z and U in the input string are non-overlapping. One embodiment relaxes the definition of the regular expression, while one embodiment does not. One embodiment still requires that X, Y, Z and U occur in the input string in that order, but may overlap.

In one embodiment, the total number of keywords in the all regular expressions counting duplicates is determined. Assume that there are k of them. The matched regular expression detection mechanism maintains a k-bit vector per session for each regular expression to be matched. The keywords of any one regular expression correspond to contiguous bits in the bit vector in the order they occur in the regular expression, with different portions of the bit vector corresponding to each of the regular expressions to be matched, with their ordering from left to right in decreasing priority of regular expression.

The matching mechanism notifies the matched regular expression detection mechanism of a matched keyword by typically providing an indication of a state. The matched regular expression detection mechanism retrieves a corresponding bit vector to identify the keywords and their positions in the expression matching bit vector to be set. However, a certain bit in the expression matching keyword bit vector can only be set if the bits corresponding to the previous keywords have been set, such as to require the keywords to be matched in the order specified by the original regular expression. One embodiment accomplishes this with an AND operation, followed by a right shift operation, followed by an OR operation.

In one embodiment, the matched regular expression detection mechanism retrieves a matched keyword bit vector which has bits set for corresponding matched keywords; however, the set bits are one position left of the actual matching bit locations (which saves one shift left operation). The matched regular expression detection mechanism then ANDs this retrieved bit vector with the expression matching bit vectors; right shifts the result, and then ORs it to the expression matching bit vectors. This takes care of all the non-first keywords. As for the first keywords, the expression matching bit vectors simply ORs the expression matching bit vectors with another bit vector that has ones wherever a matched keyword is the first one in the regular expression.

In one embodiment, bit operations are performed on the bit vector, and thus it may be desirable to optimize the value of k. One fact to note is that not every key word leads to exponentiation of states. For example, in the two expressions a*b*c and d*e*f the two keywords do not lead to doubling of states. This is because their prefixes cannot be matched simultaneously. For such keywords, one embodiment does not allocate bits in the bit vector. Two prefixes can be matched simultaneously only one is a prefix of the other. This gives as a method to optimize the number of keywords remembered by the bit vector.

One can imagine a prefix tree obtained by representing all prefixes as nodes in a tree. If all the prefixes end in distinct leaf nodes in the tree then one does not need to strip out any keywords from the regular expressions and the size of the combined DFA will not be exponential. Further one can afford one regular expression per leaf node that may contain keywords. So, in one embodiment, all regular expressions with keywords are parsed except for the longest ones among those whose prefixes end in a specific leaf node.

For example, assume there are three expressions including: a*b*c, ab*c*d, and ac*e*f. It is not necessary to break these into expressions a*, *b, and *c to prevent an exponential state explosion. if one considers a tree of these expressions having node a with leaf b and leaf c, it is only necessary that a node or one of the leaves be split. Thus, one embodiment tracks prefixes a*, ab*, and ac*. Similarly, not every expression containing keywords needs to be split into keyword expressions, as two expressions multiply only if their prefixes can match simultaneously. Thus, one can consider a tree of these prefixes, and one of the keywords doesn't need to be split from each leaf.

Turning to FIG. 1A, illustrated is a block diagram of a regular expression matching mechanism 100 used in one embodiment. Characters 101 are received by matching mechanism 104, which progressively generates one or more matched keyword indications 107 as the matched keywords are identified (and for each processed character or characters, it may not generate a match indication if there was no matching keyword detected or it may generate a null match indication). Additionally, matching mechanism 104 generates one or more matching indications of matched base expressions and non-keyword expressions 109 as they are identified. Matched regular expression detection mechanism 110, generates one or more matched regular expression indications 115 based on the received indications 107 and 109.

Figure 1B:
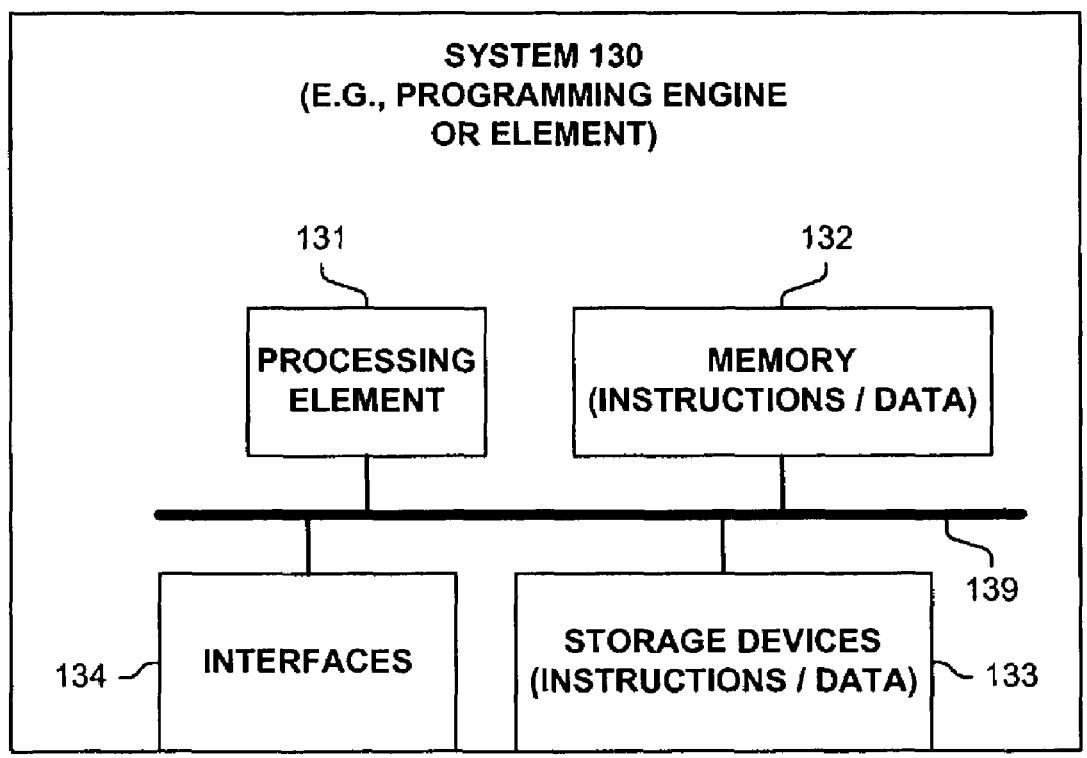
FIG. 1B is a block diagram of a programming engine used in one embodiment or a matching mechanism or element used in one embodiment.

FIG. 1B is a block diagram of system 130 (e.g., a programming engine or a matching mechanism or element) used in one embodiment. For example, in one embodiment, regular expressions to be matched are received by system 130, which partitions them into base expressions and keywords, and programs a regular expression matching mechanism, such as mechanism 100 illustrated in FIG. 1A. In one embodiment, system 130 performs one or more functions of a regular expression matching mechanism. These functions may include, inter alia, that of a matching mechanism for progressively identifying matched keywords and matched base and non-keyword expressions, and/or that of a matched regular expression detection mechanism which determines the matched regular expressions based on the receipt of such indications, and/or other functions in accordance with the invention.

In one embodiment, system 130 includes a processing element 131, memory 132, storage devices 133, and one or more interfaces 134 for communicating with other elements, other components, and/or external devices. Processing element 131, memory 132, storage devices 133, and one or more interfaces 134 are typically coupled via one or more communications mechanisms 139 (shown as a bus for illustrative purposes). Various embodiments of system 130 may include more or less elements.

The operation of system 130 is typically controlled by processing element 131 using memory 132 and storage devices 133 to perform one or more tasks or processes. Memory 132 is one type of computer-readable medium, and typically comprises random access memory (RAM), read only memory (ROM), flash memory, integrated circuits, and/or other memory components. Memory 132 typically stores computer-executable instructions to be executed by processing element 131 and/or data which is manipulated by processing element 131 for implementing functionality in accordance with the invention. Storage devices 133 are another type of computer-readable medium, and typically comprise solid state storage media, disk drives, diskettes, networked services, tape drives, and other storage devices. Storage devices 133 typically store computer-executable instructions to be executed by processing element 131 and/or data which is manipulated by processing element 131 for implementing functionality in accordance with the invention.

Figure 1C:
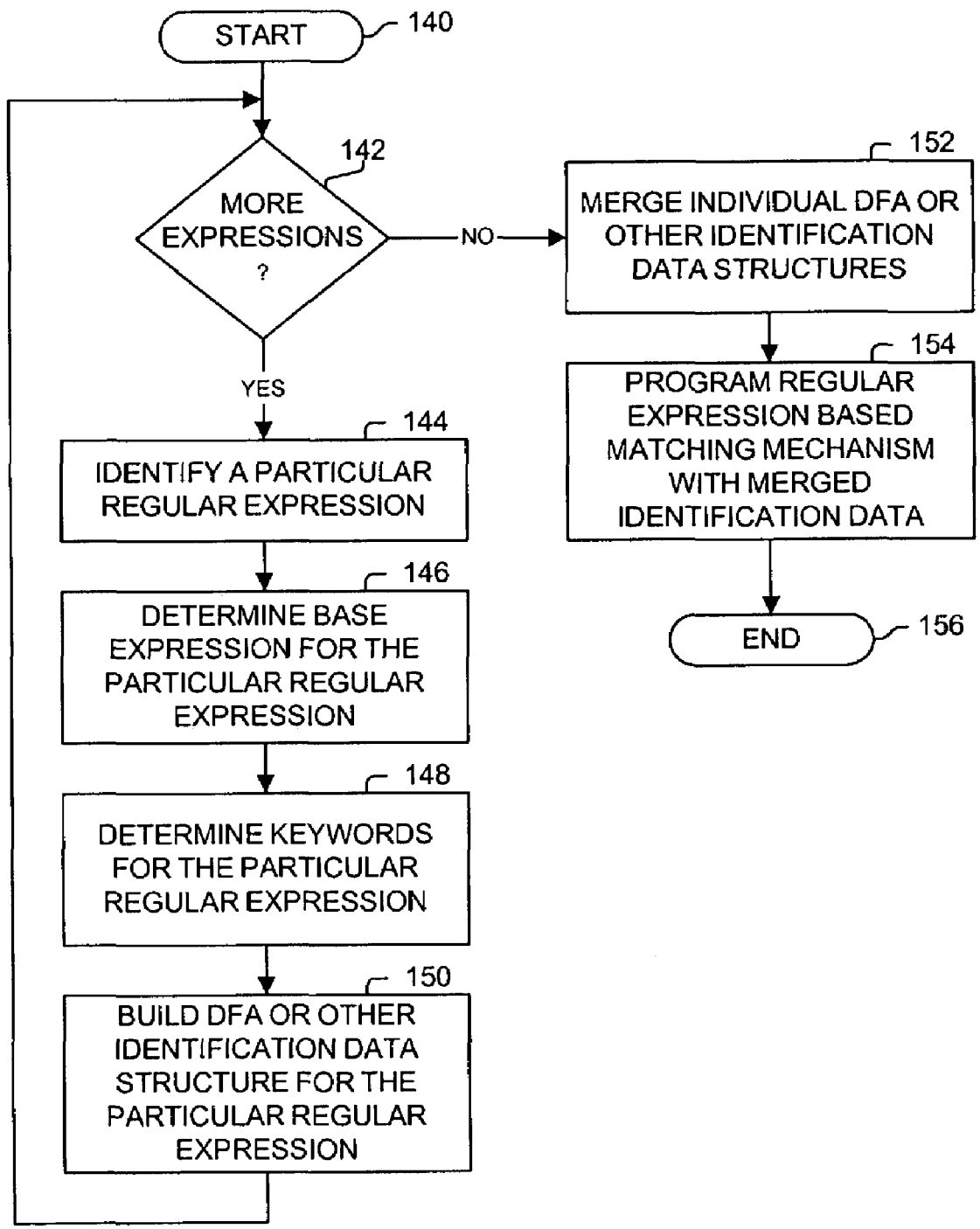
FIG. 1C is a flow diagram illustrating a process used in one embodiment for identifying one or more regular expressions to be matched and for programming a regular expression matching mechanism.

FIG. 1C is a flow diagram illustrating a process used in one embodiment for identifying one or more regular expressions to be matched and for programming a regular expression matching mechanism. Processing begins with process block 140. As determined in process block 142, if there are more expressions to be programmed, then in process block 144, a next particular regular expression is identified (e.g., received, read from memory or a data structure, etc.) Next, in process block 146, the base expression for the particular regular expression is determined; and in process block 148, the keywords corresponding to the particular regular expression are determined. In process block 150, a DFA or other identification data structure is built for the particular regular expression. Processing returns to process block 142. After the individual DFAs (or other data structures) are built for each of the regular expressions, then processing proceeds to process block 152, wherein they are multiplied or otherwise merged together, and in process block 154, the regular expression matching mechanism is programmed with the multiplied keyword and regular expression identification data structure. Processing is complete as indicated by process block 156.

Figure 2A:
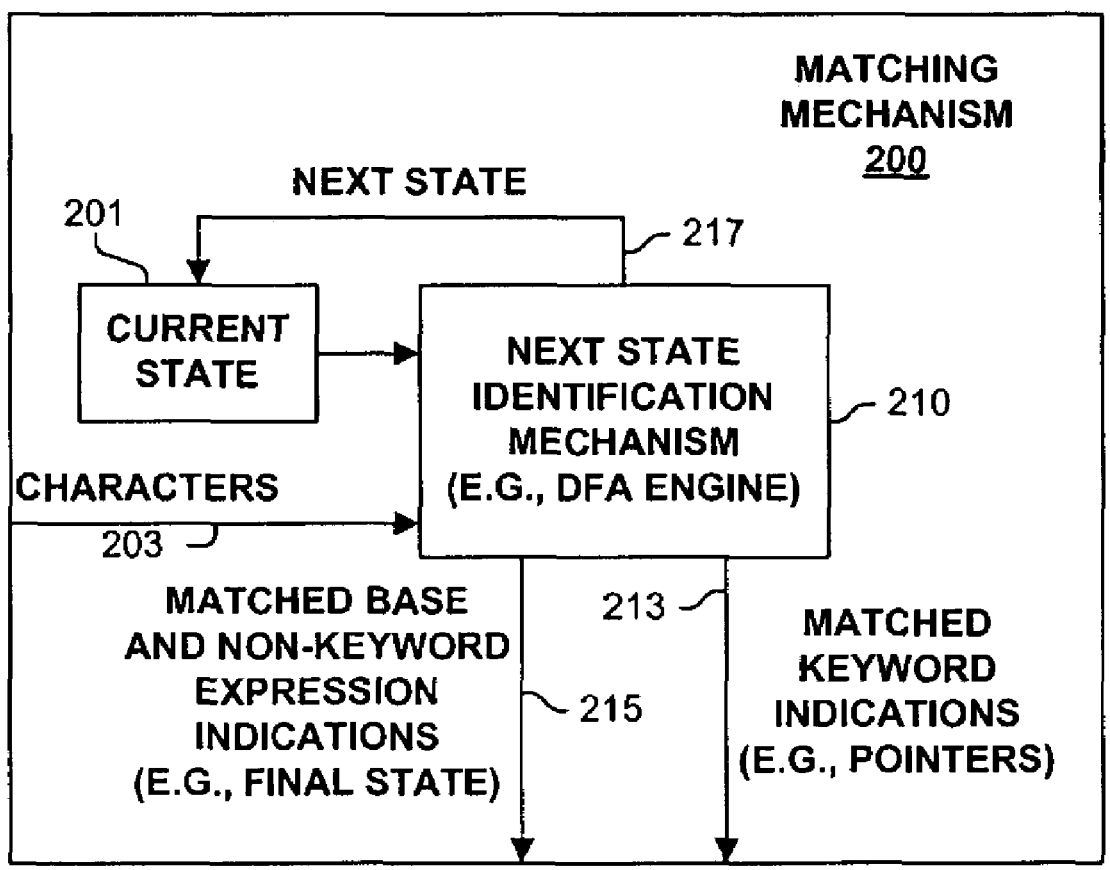
FIG. 2A is a block diagram of a matching mechanism used in one embodiment for processing each character of a plurality of input characters to progressively generate keyword indications of matched keywords as matched keywords are identified.

FIG. 2A is a block diagram of a matching mechanism 200 used in one embodiment for processing each character of a plurality of input characters 203 to progressively generate keyword indications 213 of matched keywords as matched keywords are identified, and matched based and non-keyword expression indications 215.

As shown, next state identification mechanism 210, based on current state 201 and one of the input characters 203, identifies its next state 217 (which then becomes the current state 201) and any matched keywords, matched base expressions, and matched non-keyword expressions in this next state 217, and generates corresponding indications 213 and 215 thereof. This sequence repeats for each received character of characters 203, and thus indications 213 and 215 are progressively generated. In one embodiment, next state identification mechanism 200 corresponds to a DFA engine modified to produce the progressive indications 213 and 215. In one embodiment, next state identification mechanism 200 uses a state table (e.g., state data structure) for identifying next state 217, and matched keywords, base expressions, and non-keyword expressions.

Figure 2B:
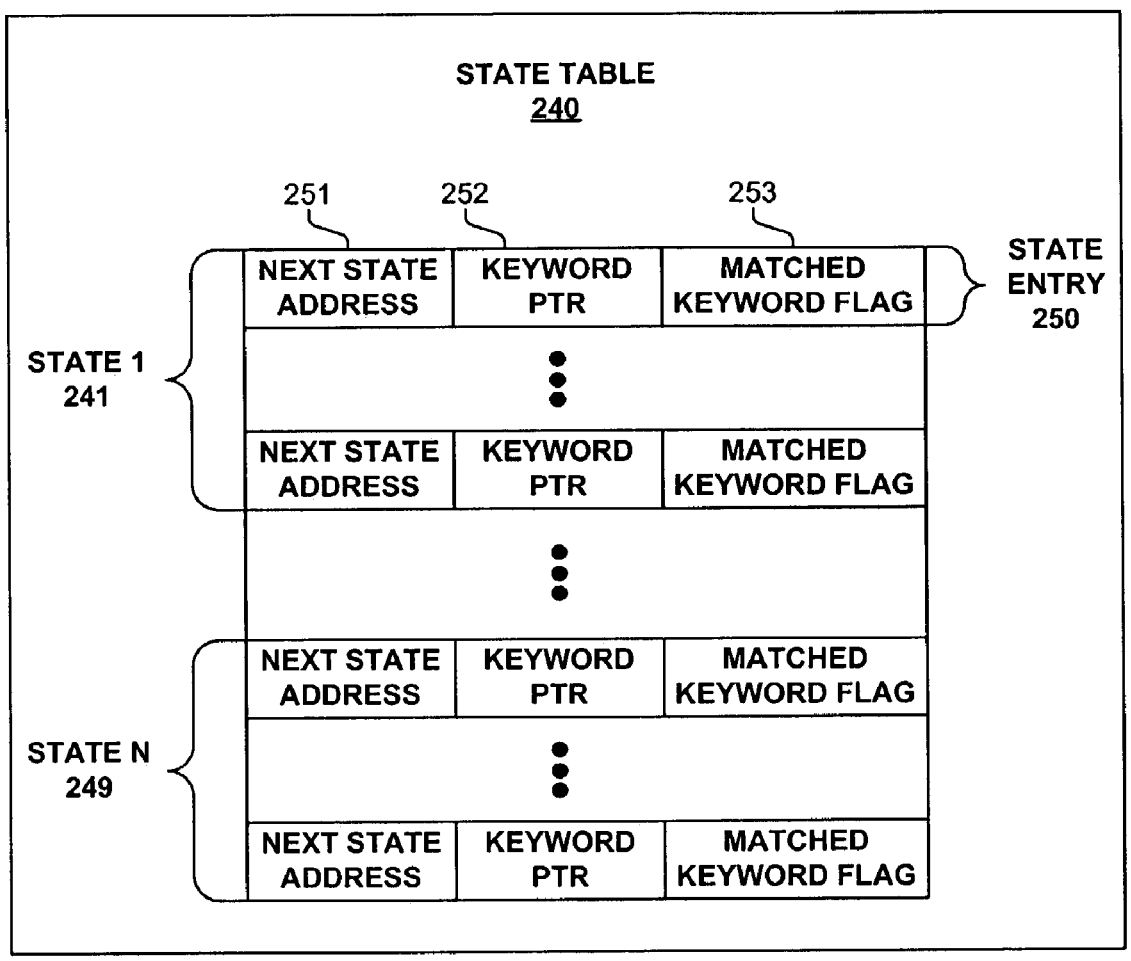
FIG. 2B is a block diagram of a state table data structure used in one embodiment.

FIG. 2B illustrates such a state table 240 used in one embodiment. As shown, a representation of each state 241–249 may include multiple state entries 250. The particular state entry 250 is determined based on a state and one an input character. For example, the state determines which grouping 241–249 of state entries 250 to reference, and the character determines which particular state entry 250 within the state or grouping. Each state entry 250 typically includes a next state address field 251 (e.g., for identifying a next state grouping 241–249), a keyword data structure pointer field 252 for identifying matched keywords, and a matched keyword flag 253 for indicating whether or not one or more keywords were matched. Note, one embodiment determines the matched base expressions and non-keyword expressions based on a value of the state itself.

Figure 2C:
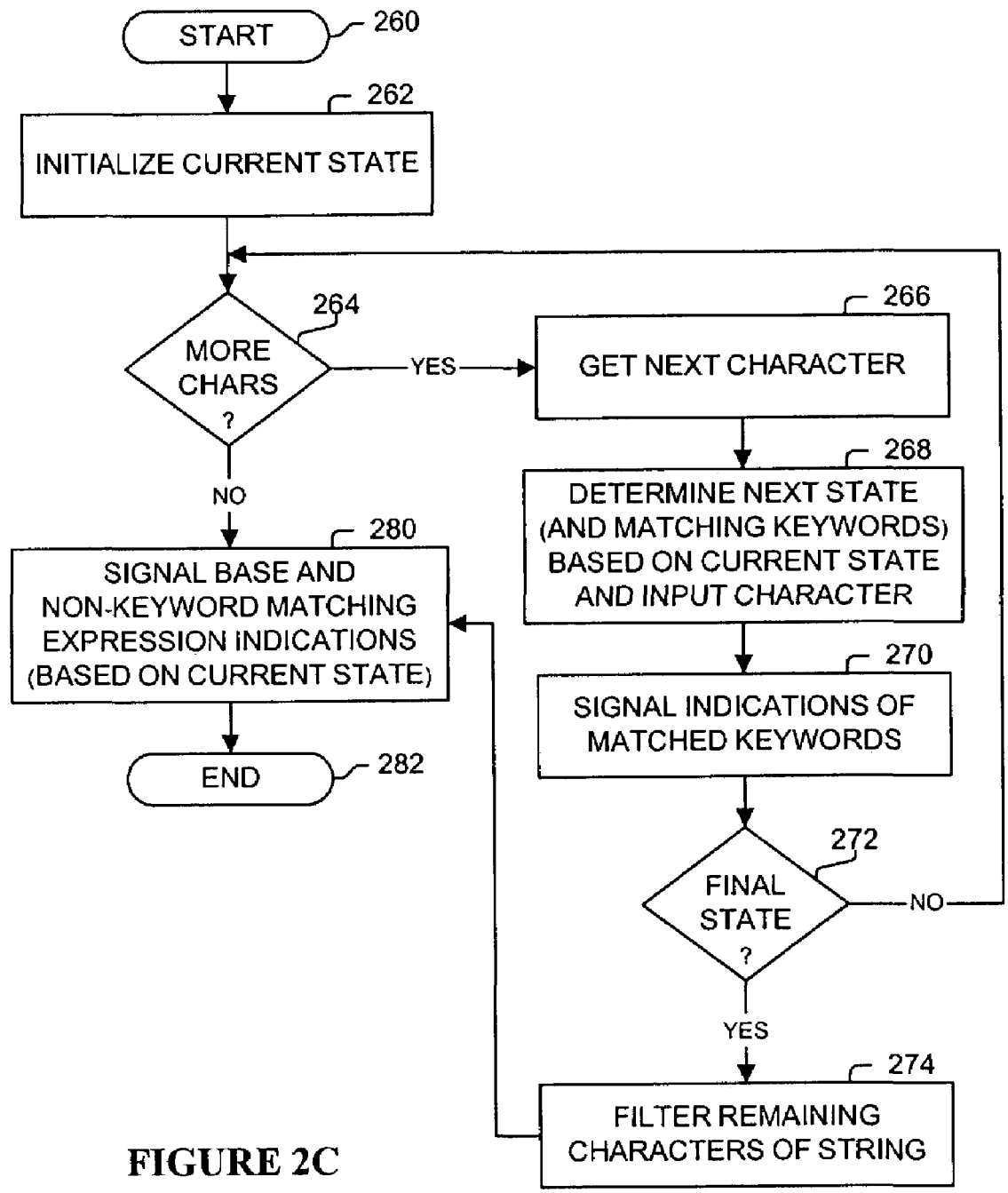
FIG. 2C is a flow diagram illustrating a process used in one embodiment of a matching mechanism.

FIG. 2C illustrates a process used in one embodiment of a matching mechanism. Processing begins with process block 260, and proceeds to process block 262, wherein the current state is initialized to a start state. As determined in process block 264, while there are more characters to process, a next character is identified (e.g., received, read from memory, etc.) in process block 266. Then, in process block 268, the next state and matching keywords (if any) are determined based on the current state and the input character. Then, in process block 270, indications of matching keywords are generated if there were any. As determined in process block 272, if the current state is not the final state, then processing returns to process block 264. Otherwise, in process block 274, any remaining characters of the string or stream of characters are filtered, and processing proceeds to process block 280. When processing reaches process block 280, indications of matching base expressions and non-keyword expressions are generated. In one embodiment, these indications may include a list of expressions or an index to a list of expressions (e.g., a value of the final state), or any other signaling mechanism. Processing is complete as indicated by process block 282.

Figure 3A:
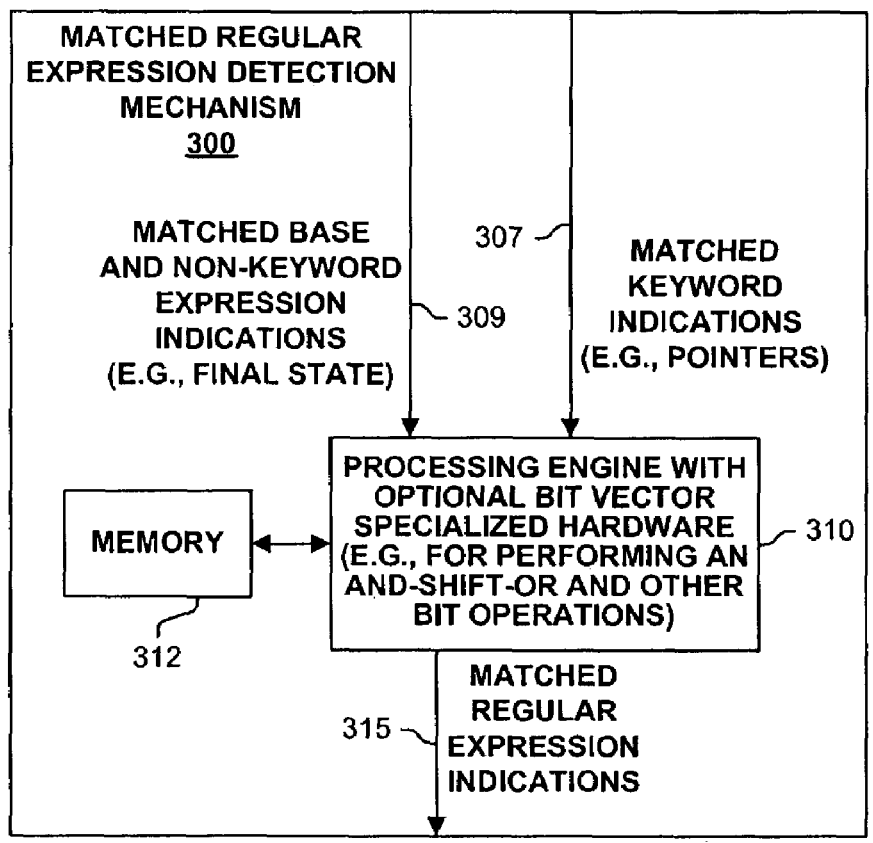
FIG. 3A is a block diagram of a matched regular expression detection mechanism used in one embodiment.

FIG. 3A illustrates a matched regular expression detection mechanism 300 used in one embodiment. As matched keyword indications 307 are progressively received, processing engine 310 (with optional bit vector specialized hardware, such as for performing an AND-SHIFT-OR operation) updates a data structure typically stored in memory 312 to maintain the matched keywords. Note, typically, a keyword is identified as being matched for a particular regular expression if it is a first keyword for the regular expression or all other preceding keywords for the particular regular expression have been previously matched. When processing engine 310 receives an indication 309 of any matched base and non-keyword expressions, processing engine 310 generates an indication 315 of a highest priority, or possibly multiple matched regular expressions. FIG. 3E illustrates one such process, but first a few data structures used in one embodiment of a matched regular expression detection mechanism 300 are illustrated.

Figure 3B:
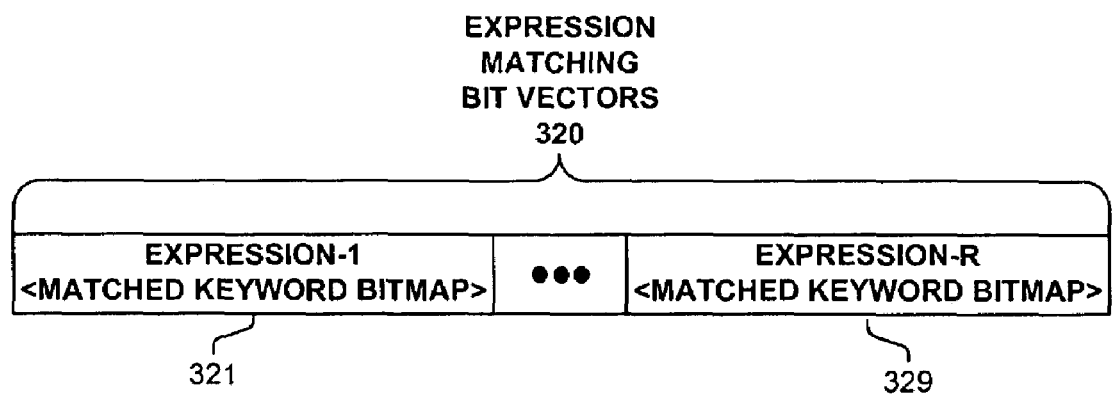
FIG. 3B is a block diagram of an expression matching bitmap data structure used in one embodiment.

FIG. 3B illustrates an expression matching bit vector data structure 320 used in one embodiment. Each regular expression to be matched has a corresponding matched keyword bitmap 321–329, which are updated as the indications of matched keywords are received. Typically, it is desirable to keep the number of keywords tracked to a small number, such as 128 to 1024, as the bit operations can be expensive, such as in the time or hardware required to perform the bit operations. Each bitmap 321–329 contains a bitmap of consecutive bits, with each bit corresponding to a keyword in its corresponding regular expression, and the ordering of the bits/keywords correspond to the order in which they must be matched by an incoming sting.

Figure 3C:
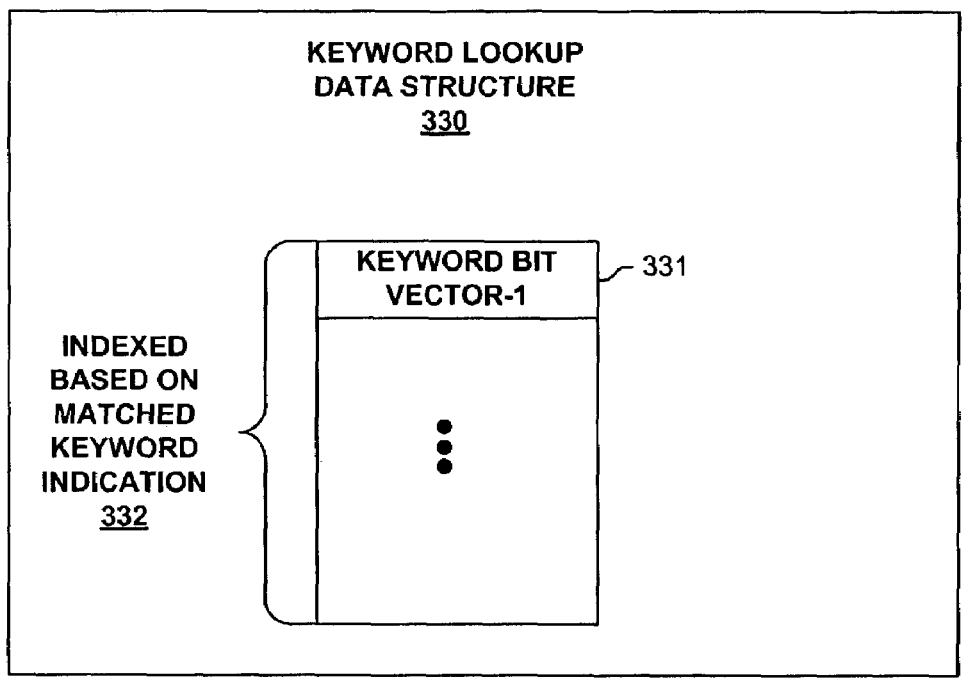
FIG. 3C is a block diagram of a matched keyword data structure used in one embodiment.

FIG. 3C illustrates a keyword lookup data structure 330 used in one embodiment. Keyword lookup data structure 330 is indexed based on a received matched keyword indication 332 to identify a keyword bit vector 331, which has bits set at positions corresponding to the matched keywords in the regular expressions. Processing engine 310 can then easily updated expression matching bit vector data structure 320 efficiently using an AND-SHIFT-OR operation, to set only those bits corresponding to matched keywords which are in a first position for a regular expression, or which has all prior keyword bits set (e.g., the previous bit being set indicates this).

Figure 3D:
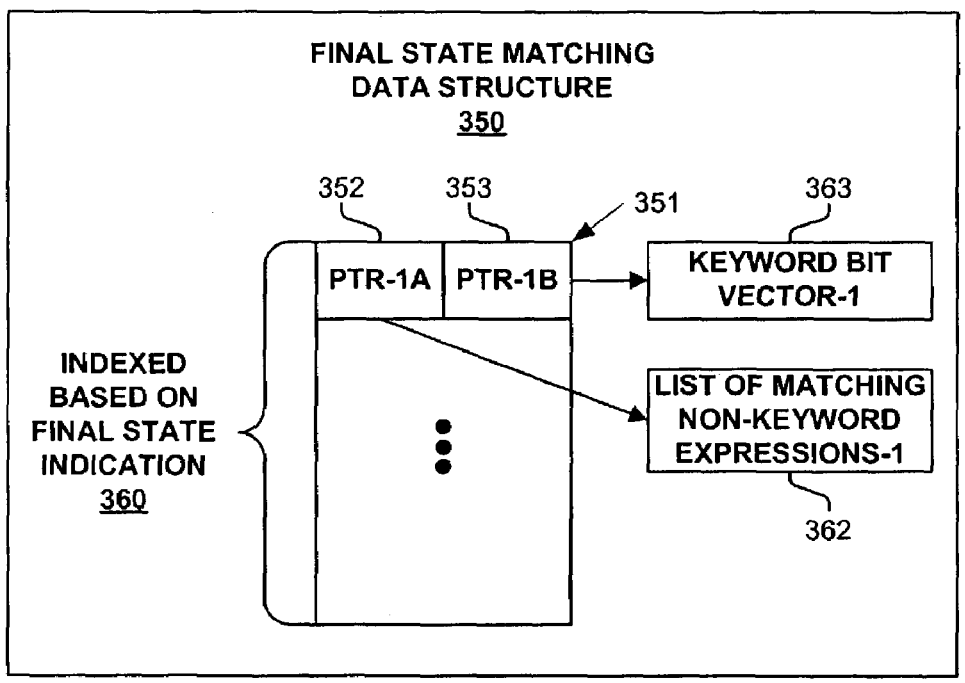
FIG. 3D is a block diagram of a final state matching data structure used in one embodiment.
Figure 3E:
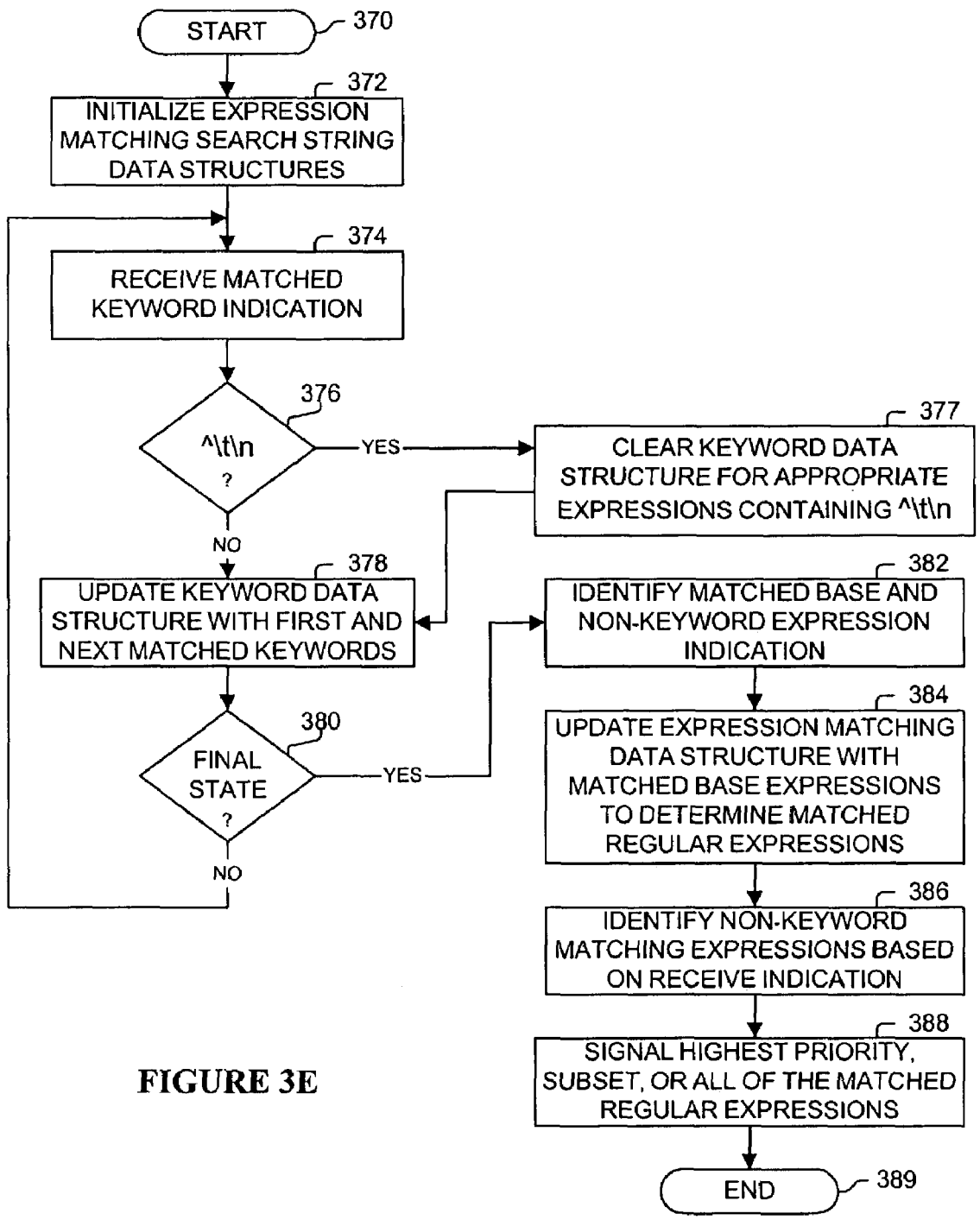
FIG. 3E is a flow diagram illustrating a process used in one embodiment for determining matched regular expressions based on received indications of matched keywords, base expressions, and non-keyword expressions.

Additionally, FIG. 3D illustrates a final state matching data structure 350 used in one embodiment. By indexing based on a final state indication 360, an entry 351 typically including two pointer fields 352 and 353 is identified. Pointer fields 352 and 353 point or otherwise indicate a keyword bit vector 363 and a list of matching non-keyword expressions 362. Expression matching bit vector data structure 320 is then updated, typically using an AND operation based on keyword bit vector 363, which, in one embodiment, has a bit set (and cleared otherwise) corresponding to the last keyword of an expression for each expression whose base expression has been matched. After the AND operation, expression matching bit vector data structure 320 then indicates the matching regular expressions, i.e., those being the expressions whose corresponding bit for the last keyword of an expression in matched keyword bitmap 321–329 is set (or those expressions that has all bits set.) In one embodiment, based on the bitmap updating mechanism used which only allows a bit to be set if all proceeding bits (if any) are previously set, then only the last bit of a matched keyword bitmap 321–329 needs to be checked to determine if the corresponding regular expression has been matched. In one embodiment, indications of all matching regular expressions are generated; while in one embodiment, an indication of only the highest priority matching keyword or non-keyword regular expression is generated.

FIG. 3E illustrates a process used in one embodiment of a mechanism for determining matched regular expressions based on progressively received indications of matched keywords. Processing begins with process block 370, and proceeds to process block 372, wherein the data structures used in determining whether or not a particular regular expression has been matched are initialized. Next, in process block 374, an indication of matched keywords is received.

One embodiment provides a mechanism to reset the keyword data structure for expressions indicating such upon receipt of a TAB-NEW LINE sequence as this sequence is typically used to delineate commands which must be in the same line, sentences, or other sequences of text or other strings on which matching operations are typically performed. In one embodiment, this reset feature is indicated using "[^\t\n]". Note, the notation '*' has been previously used herein to denote matching zero or more characters. One embodiment uses the notation "'.*'" to denote matching zero or more characters (i.e., '.' indicates to match one character and '*' indicates to perform the previous part of the expression zero or more times.) Thus, in their respective contexts, the expressions a*b and a.*b are equivalent expressions. In one embodiment, the notation "[^\t\n]" is used to indicate matching anything except \t\n ('^' is used in this context to denote the not operation). Thus, a regular expression defined as a [^\t\n]*b\[^\t\n]*c indicates to match the base expression a*c with keyword b identified as being all on the same line.

Thus, as determined in process block 376, if the expression TAB-NEW LINE is identified, then in process block 377, the keyword data structure is cleared for those regular expressions (or portions thereof) which require some matching of its keywords on the same line (e.g., before receiving \t\n). In one embodiment, this predetermined special trigger for resetting the keyword data structure corresponds to a suffix keyword expression ending in a tab or new line character.

Next, in process block 378 the keyword data structure is updated with first and next matched keywords (e.g., only for those keywords with all proceeding keywords, if any, previously matched) as required for identified keywords. Note, every identified keyword will not cause the keyword data structure to be updated. Next, as determined in process block 380, if a final state has not been reached, then processing returns to process block 374.

Otherwise, in process block 382, the indication of the matched base and non-keyword expressions is identified. In process block 384, the expression matching data structure is updated based on the matched base expressions to determine the matched regular expressions. In process block 386, the matching non-keyword expressions are identified. Finally, in process block 388, the highest priority, or another subset (including possibly all) of the matching keyword and/or non-keyword expressions are signaled or identified. Processing is complete as indicated by process block 389.

Figure 4:
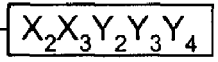
FIG. 4 illustrates bitmaps and operations used to determine matching regular expressions in one embodiment.

FIG. 4 illustrates an example of the bitmaps and bit operations used in one embodiment to identify whether one or more regular expressions are matched. This example assumes there are two regular expressions 401 and 402 to be matched. Regular expression 401 is $X_1*X_2*X_3*X_4$ and regular expression 402 is $Y_1*Y_2*Y_3*Y_4*Y_5$. Thus, these two expressions 401 and 402 contain base expressions $X_1*X_4$ and $Y_1*Y_5$, and keyword expressions $X_2, X_3, Y_2, Y_3$, and $Y_4$. The corresponding expression matching bit vector 403 is illustrated which contains a single bit for each of the five keyword expressions, with consecutive bits assigned in the order they must be matched for each of the two expressions 401 and 402.

Assume the expression matching bitmap at time T (410) is 10110, which indicates that keywords $X_2, Y_2$, and $Y_3$ have been previously matched in the proper order within each of the two expressions 401 and 402. Also, assume keyword bitmap indicating newly matched keywords at time T (411) is generated. Note, to save a left shift operation, the set bits correspond to matching keywords offset by one bit to the right. Thus, keyword bitmap indicating newly matched keywords at time T (411) indicates that keywords $X_3$ and $Y_4$ have been just matched. (One embodiment performs this extra shift operation.) Bitmaps 410 and 411 are AND'ed to produce bitmap 412, which is shifted to the right one position to produce bitmap 413 (of course other embodiment might produce another shift resultant bitmap such as set bits being shifted in, etc.) Bitmap 413 is then OR'ed to bitmap 410 to produce the AND-SHIFT-OR result 414. The AND operation with the bitmap offset by one position leaves only bits set for the newly matched keywords whose previous bit is set (i.e., keyword is matched). Thus, the AND-SHIFT-OR operation provides an efficient mechanism to identify the keywords that are matched in the proper sequence.

Next, assume that indication of matched base expressions bit vector 415 is received which indicates by the set bit in the last keyword position corresponding to expression-2 402, that base expression $Y_1 * Y_5$ of expression-2 402 was matched, and also indicates by the clear bit in the last keyword position corresponding to expression-1 401, that base expression $X_1 * X_4$ was not matched. Bit vectors 414 and 415 are then AND'ed to produce bit vector 416 which indicates by the set bit in the last keyword position keyword position corresponding to expression-2 402, that expression-2 402 was matched, and by the clear bit in the last keyword position keyword position corresponding to expression-1 401, that expression-1 401 was not matched.

In view of the many possible embodiments to which the principles of our invention may be applied, it will be appreciated that the embodiments and aspects thereof described herein with respect to the drawings/figures are only illustrative and should not be taken as limiting the scope of the invention. For example and as would be apparent to one skilled in the art, many of the process block operations can be re-ordered to be performed before, after, or substantially concurrent with other operations. Also, many different forms of data structures could be used in various embodiments. The invention as described herein contemplates all such embodiments as may come within the scope of the following claims and equivalents thereof.

What is claimed is:

1. An apparatus for performing regular expression matching, the apparatus comprising:
    a matching mechanism configured to process the value of each character of a plurality of input characters in order to progressively generate matched indications in response to matching a keyword, base expression or non-keyword expression based on processing the values of said input characters; and
    a matched regular expression detection mechanism, coupled to the matching mechanism, configured to receive said matched indications from the matching mechanism, to process said received matched indications based on their relative order to identify whether or not one or more regular expressions have been matched, and to generate one or more matched regular expression indications in response to said processing of said received matched indications identifying said one more regular expressions as being matched.

2. The apparatus of claim 1, wherein the matched regular expression detection mechanism includes a keyword data structure, and said received keyword indications include a reference to an entry in the keyword data structure for identifying a particular entry of a plurality of entries for tracking an ordered matching of keywords of a regular expression corresponding to the particular entry.

3. The apparatus of claim 2, wherein the matched regular expression detection mechanism includes a final state data structure, the final state data structure including a plurality of final state entries, each of the plurality of final state entries identifying matched base expressions and non-keyword expressions for a corresponding final state.

4. The apparatus of claim 3, wherein the keyword data structure is updated based on one or more matched base expressions identified in the final state data structure based on said one or more matching indications.

5. The apparatus of claim 1, wherein the matched regular expression detection mechanism includes a final state data structure, the final state data structure including a plurality of final state entries, each of the plurality of final state entries identifying matched base expressions and non-keyword expressions for a corresponding final state.

6. The apparatus of claim 1, wherein said one or more matched regular expression indications indicate one or more of said regular expressions identified as being matched or a single, highest-priority matching expression of said regular expressions identified as being matched.

7. The apparatus of claim 1, wherein the matched regular expression detection mechanism includes one or more keyword bitmaps; wherein a particular bit of a particular keyword bitmap of said one or more keyword bitmaps corresponding to a particular keyword identified as matched in a particular keyword indication of said received matched indications is set only if the previous adjacent bit in particular keyword bitmap is currently set if it is not a first bit of the particular keyword bitmap.

8. The apparatus of claim 1, wherein the matching mechanism includes a state machine used in said processing the value of each character of the plurality of input characters.

9. The apparatus of claim 8, wherein the state machine is a deterministic finite automation.

10. A method for performing regular expression matching in order to identify one or more matching expressions, the method comprising:
    a first stage state machine processing the value of each character of a string of characters on which to perform matching, said processing including: determining a next state of a state machine; identifying for said determined next state whether there are any newly matched keywords, and if so, generating an indication of said newly matched keywords; and identifying whether said determined next state is a final state, and if so, generating an indication of a base or non-keyword matching expression; and
    a second stage receiving said indications of the said newly matched keywords in the order generated and of the base or non-keyword matching expression, updating a keyword expression data structure based on said received indications of said newly matched keywords for all occurrences of said newly matched keywords in which all keywords preceding said newly matched keywords in an expression have been previously matched, and determining and generating indications of said one or more matching expressions based on the keyword expression data structure and said indications of base and non-keyword matching expressions.

11. The method of claim 10, wherein said indication of base and non-keyword matching expression include an index into a final state data structure; and
    wherein said determining one or more matching expression includes:

performing a lookup operation of the final state data structures based on said the index to identifying matched base expressions and non-keyword expressions; and updating the keyword data structure based on said matched base expressions and non-keyword expressions.

12. The method of claim 10 comprising: initializing the keyboard expression data structure when said indication of base and non-keyword matching expressions corresponds to a suffix keyword expression ending in a tab or new line character.

13. The method of claim 10, comprising: initializing the keyword expression data structure when said indication of base and non-keyword matching expressions corresponds to a predetermined keyword trigger.

14. The method of claim 13, wherein the predetermined keyword trigger includes a TAB-NEW LINE sequence.

15. The method of claim 10, wherein the keyword expression data structure includes one or more keyword bitmaps; and wherein said updating a keyword expression data structure includes setting a particular bit of a particular keyword bitmap of said one or more keyword bitmaps corresponding to a particular keyword identified as matched in a particular keyword indication of said one or more keyword indications only if the previous adjacent bit in particular keyword bitmap is currently set if it is not a first bit of the particular keyword bitmap.

16. An apparatus for performing regular expression matching in order to identify one or more matching expressions, the apparatus comprising:

a matching mechanism including: means for processing the value of each character of a string of characters on which to perform matching, said means for processing including: means for determining a next state; means for identifying whether there are newly matched keywords, and if so, generating an indication of said newly matched keywords; and means for identifying whether the next state is a final state, and if so, generating an indication of base and non-keyword matching expressions;

a matched regular expression detection mechanism, coupled to the matching mechanism, configured to received said indications of the said newly matched keywords in the order generated and said indication of base and non-keyword matching expressions; the matched regular expression detection mechanism including: means for updating a keyword expression data structure based on said newly matched keywords for all occurrences in of said newly matched keywords in which all keywords preceding said newly matched keywords in an expression have been previously matched; and means for determining and generating indications thereof said one or more matching expressions based on the keyword expression data structure and said indication of base and non-keyword matching expressions.

17. The apparatus of claim 16, wherein said indication of base and non-keyword matching expressions include an index into a final state data structure; and wherein said means for determining and generating indications thereof said one or more matching expressions includes:

means for performing a lookup operation of the final state data structure based on said the index to identifying matched base expressions and non-keyword expressions; and means for updating the keyword data structure based on said matched base expressions and non-keyword expressions.

18. The apparatus of claim 16, wherein the keyword expression data structure includes one or more keyword bitmaps; and wherein said means for updating a keyword expression data structure includes means for setting a particular bit of a particular keyword bitmap of said one or more keyword bitmaps corresponding to a particular keyword identified as matched in a particular keyword identification of said one or more keyword identifications only if the previous adjacent bit in particular keyword bitmap is currently set if it is not a first bit of the particular keyword bitmap.

19. An apparatus for performing regular expression matching, the apparatus comprising:

a matching mechanism configured to process the value of each character of a plurality of input characters in order to progressively generate one or more keyword indications of matched keywords when one or more matched keywords are identified; and a matched regular expression detection mechanism, coupled to the matching mechanism, and configured to receive said keyword indications of matched keywords from the matching mechanism and configured to generate one or more matched regular expression indications based on said received keyword indications in response to the matched regular expression detection mechanism identifying one or more regular expressions as being matched.

20. The apparatus of claim 19, wherein the matched regular expression detection mechanism includes a keyword data structure, and said received keyword indications include a reference to an entry in the keyword data structure for identifying a particular entry of a plurality of entries for tracking an ordered matching of keywords for a regular expression corresponding to the particular entry.

21. The apparatus of claim 19, wherein the matched regular expression detection mechanism includes one or more keyword bitmaps; wherein a particular bit of a particular keyword bitmap of said one or more keyword bitmaps corresponding to a particular keyword identified as matched in a particular keyword indication of said received keyword indications is set if it is not a first bit of the particular keyword bitmap only if the previous adjacent bit in particular keyword bitmap is currently set.

22. The apparatus of claim 21, wherein the matched regular expression detection mechanism includes means for bit manipulating said keyword bitmaps, including means for performing an AND-SHIFT-OR operation on said keyword bitmaps.

23. The apparatus of claim 19, wherein the matching mechanism includes a state machine used in said processing the value each character of the plurality of input characters.

24. The apparatus of claim 23, wherein the state machine is a deterministic finite automation.

* * * * *

UNITED STATES PATENT AND TRADEMARK OFFICE
CERTIFICATE OF CORRECTION

PATENT NO. : 7,308,446 B1  
APPLICATION NO. : 10/340392  
DATED : December 11, 2007  
INVENTOR(S) : Panigrahy et al.

Page 1 of 1

It is certified that error appears in the above-identified patent and that said Letters Patent is hereby corrected as shown below:

Title Page; item (56);
OTHER PUBLICATIONS

M. Barrio reference: Replace "Iasted, Iasted" with -- IASTED, IASTED --

R. Boyer reference: Replace "pp. 761-772" with -- pp. 762-772 --

Josue Kuri reference: Replace "String Proceedings" with -- String Processing --

Col. 13, line 61-62, replace "one more" with -- one or more --

Col. 14, line 37, replace "automation" with -- automaton --

Col. 14, line 64, replace "expression" with -- expressions --

Col. 14, line 66-67, replace "expression" with -- expressions --

Col. 15, line 2, replace "structures" with -- structure --

Col. 15, line 9, replace "keyboard" with -- keyword --

Col. 15, line 36, replace "are newly" with -- are any newly --

Col. 16, line 14, replace "identification" with -- indication --

Col. 16, line 15, replace "identifications" with -- indications --

Col. 16, line 60, replace "automation" with -- automaton --

Signed and Sealed this

Twenty-first Day of July, 2009

JOHN DOLL  
*Acting Director of the United States Patent and Trademark Office*